US012732518B2

(12) United States Patent
Liu et al.

(10) Patent No.: US 12,732,518 B2
(45) Date of Patent: Sep. 8, 2026

(54) LOG ANOMALY DETECTION USING TEMPORAL-ATTENTIVE DYNAMIC GRAPHS

(71) Applicant: NEC Laboratories America, Inc., Princeton, NJ (US)

(72) Inventors: Yanchi Liu, Monmouth Junction, NJ (US); Haifeng Chen, West Windsor, NJ (US); Yufei Li, Monmouth Junction, NJ (US)

(73) Assignee: NEC Corporation, Tokyo (JP)

( * ) Notice: Subject to any disclaimer, the term of this patent is extended or adjusted under 35 U.S.C. 154(b) by 154 days.

(21) Appl. No.: 18/359,179

(22) Filed: Jul. 26, 2023

(65) Prior Publication Data

US 2024/0064161 A1 Feb. 22, 2024

Related U.S. Application Data

(60) Provisional application No. 63/523,395, filed on Jun. 27, 2023, provisional application No. 63/399,230, filed on Aug. 19, 2022.

(51) Int. Cl.
*H04L 9/40* (2022.01)
*H04L 41/16* (2022.01)

(52) U.S. Cl.
CPC .......... *H04L 63/1425* (2013.01); *H04L 41/16* (2013.01)

(58) Field of Classification Search
CPC . H04L 63/1425; H04L 63/1416; H04L 67/10; H04L 63/20; H04L 43/08;

(Continued)

(56) References Cited

U.S. PATENT DOCUMENTS 8,887,286 B2 11/2014 Dupont et al.
9,596,254 B1 3/2017 Muddu et al.

(Continued)

FOREIGN PATENT DOCUMENTS

KR 20140081871 A * 7/2014 .......... G06F 9/5077

OTHER PUBLICATIONS

Du, M., Li, F., Zheng, G., & Srikumar, V. (Oct. 30, 2017). Deeplog: Anomaly detection and diagnosis from system logs through deep learning. In Proceedings of the 2017 ACM SIGSAC conference on computer and communications security (pp. 1285-1298).

(Continued)

*Primary Examiner* — Kyung H Shin
(74) *Attorney, Agent, or Firm* — Vincent Duffy

(57) ABSTRACT

A computer-implemented method for employing a graph-based log anomaly detection framework to detect relational anomalies in system logs is provided. The method includes collecting log events from systems or applications or sensors or instruments, constructing dynamic graphs to describe relationships among the log events and log fields by using a sliding window with a fixed time interval to snapshot a batch of the log events, capturing sequential patterns by employing temporal-attentive transformers to learn temporal dependencies within the sequential patterns, and detecting anomalous patterns in the log events based on relationships between the log events and temporal context determined from the temporal-attentive transformers.

20 Claims, 7 Drawing Sheets

(58) Field of Classification Search
CPC ....... H04L 49/70; H04L 47/125; H04L 47/76; H04L 63/1441; H04W 12/12; H04W 12/35; G06N 20/20; G06N 5/047; G06N 20/00; G06N 5/04; G06N 3/044; G06N 5/01; G06N 3/084; G06F 8/71; G06F 8/433; G06F 8/38; G06F 16/901; G06F 16/906; G06F 9/5077; G06F 21/552; G06F 21/55; G06F 21/554
See application file for complete search history.

(56) References Cited

U.S. PATENT DOCUMENTS

| | | | | |
|---|---|---|---|---|
| 2005/0143976 | A1 | 6/2005 | Steniford et al. | |
| 2007/0289013 | A1 | 12/2007 | Lim et al. | |
| 2012/0137367 | A1 | 5/2012 | Dupont et al. | |
| 2015/0058982 | A1 | 2/2015 | Eskin et al. | |
| 2015/0106324 | A1 | 4/2015 | Puri et al. | |
| 2017/0063905 | A1 | 3/2017 | Muddu et al. | |
| 2017/0310690 | A1* | 10/2017 | Mestha | H04L 63/1441 |
| 2019/0068627 | A1* | 2/2019 | Thampy | H04L 63/1425 |
| 2022/0027777 | A1* | 1/2022 | Schmidt | G06N 20/00 |
| 2023/0176838 | A1* | 6/2023 | Bronevetsky | G06F 8/71<br>717/110 |

OTHER PUBLICATIONS

Zhang, C., Peng, X., Sha, C., Zhang, K., Fu, Z., Wu, X., . . . & Zhang, D. (May 21, 2022). DeepTraLog: Trace-log combined microservice anomaly detection through graph-based deep learning. In Proceedings of the 44th International Conference on Software Engineering (pp. 623-634).

Guo, H., Yuan, S., & Wu, X. (Jul. 18, 2021). Logbert: Log anomaly detection via bert. In 2021 international joint conference on neural networks (IJCNN) (pp. 1-8). IEEE.

Jia, T., Wu, Y., Hou, C., & Li, Y. (Oct. 25, 2021). LogFlash: Real-time streaming anomaly detection and diagnosis from system logs for large-scale software systems. In 2021 IEEE 32nd International Symposium on Software Reliability Engineering (ISSRE) (pp. 80-90). IEEE.

Xie, Y., Zhang, H., & Babar, M. A. (Dec. 5, 2022). LogGD: Detecting Anomalies from System Logs with Graph Neural Networks. In 2022 IEEE 22nd International Conference on Software Quality, Reliability and Security (QRS) (pp. 299-310). IEEE.

Meng, W., Liu, Y., Zhu, Y., Zhang, S., Pei, D., Liu, Y., . . . & Zhou, R. (Aug. 10, 2019). Loganomaly: Unsupervised detection of sequential and quantitative anomalies in unstructured logs. In IJCAI (vol. 19, No. 7, pp. 4739-4745).

* cited by examiner

LOG ANOMALY DETECTION USING TEMPORAL-ATTENTIVE DYNAMIC GRAPHS

RELATED APPLICATION INFORMATION

This application claims priority to Provisional Application No. 63/399,230 filed on Aug. 19, 2022, and Provisional Application No. 63/523,395 filed on Jun. 27, 2023, the contents of both of which are incorporated herein by reference in their entirety.

BACKGROUND

Technical Field

The present invention relates to anomaly detection, and, more particularly, to log anomaly detection using temporal-attentive dynamic graphs.

Description of the Related Art

Logs play an important role in system monitoring and debugging by recording valuable system information, including events and status. Although various methods have been proposed to detect anomalies in log sequences, they often overlook the significance of considering relationships among system components, such as services and users, which can be identified from log contents. Understanding these relationships is beneficial for identifying anomalies and their underlying causes.

SUMMARY

A method for employing a graph-based log anomaly detection framework to detect relational anomalies in system logs is presented. The method includes collecting log events from systems or applications or sensors or instruments, constructing dynamic graphs to describe relationships among the log events and log fields by using a sliding window with a fixed time interval to snapshot a batch of the log events, capturing sequential patterns by employing temporal-attentive transformers to learn temporal dependencies within the sequential patterns, and detecting anomalous patterns in the log events based on relationships between the log events and temporal context determined from the temporal-attentive transformers.

A non-transitory computer-readable storage medium comprising a computer-readable program for employing a graph-based log anomaly detection framework to detect relational anomalies in system logs is presented. The computer-readable program when executed on a computer causes the computer to perform the steps of collecting log events from systems or applications or sensors or instruments, constructing dynamic graphs to describe relationships among the log events and log fields by using a sliding window with a fixed time interval to snapshot a batch of the log events, capturing sequential patterns by employing temporal-attentive transformers to learn temporal dependencies within the sequential patterns, and detecting anomalous patterns in the log events based on relationships between the log events and temporal context determined from the temporal-attentive transformers.

A system for employing a graph-based log anomaly detection framework to detect relational anomalies in system logs is presented. The system includes a processor and a memory that stores a computer program, which, when executed by the processor, causes the processor to collect log events from systems or applications or sensors or instruments, construct dynamic graphs to describe relationships among the log events and log fields by using a sliding window with a fixed time interval to snapshot a batch of the log events, capture sequential patterns by employing temporal-attentive transformers to learn temporal dependencies within the sequential patterns, and detect anomalous patterns in the log events based on relationships between the log events and temporal context determined from the temporal-attentive transformers.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
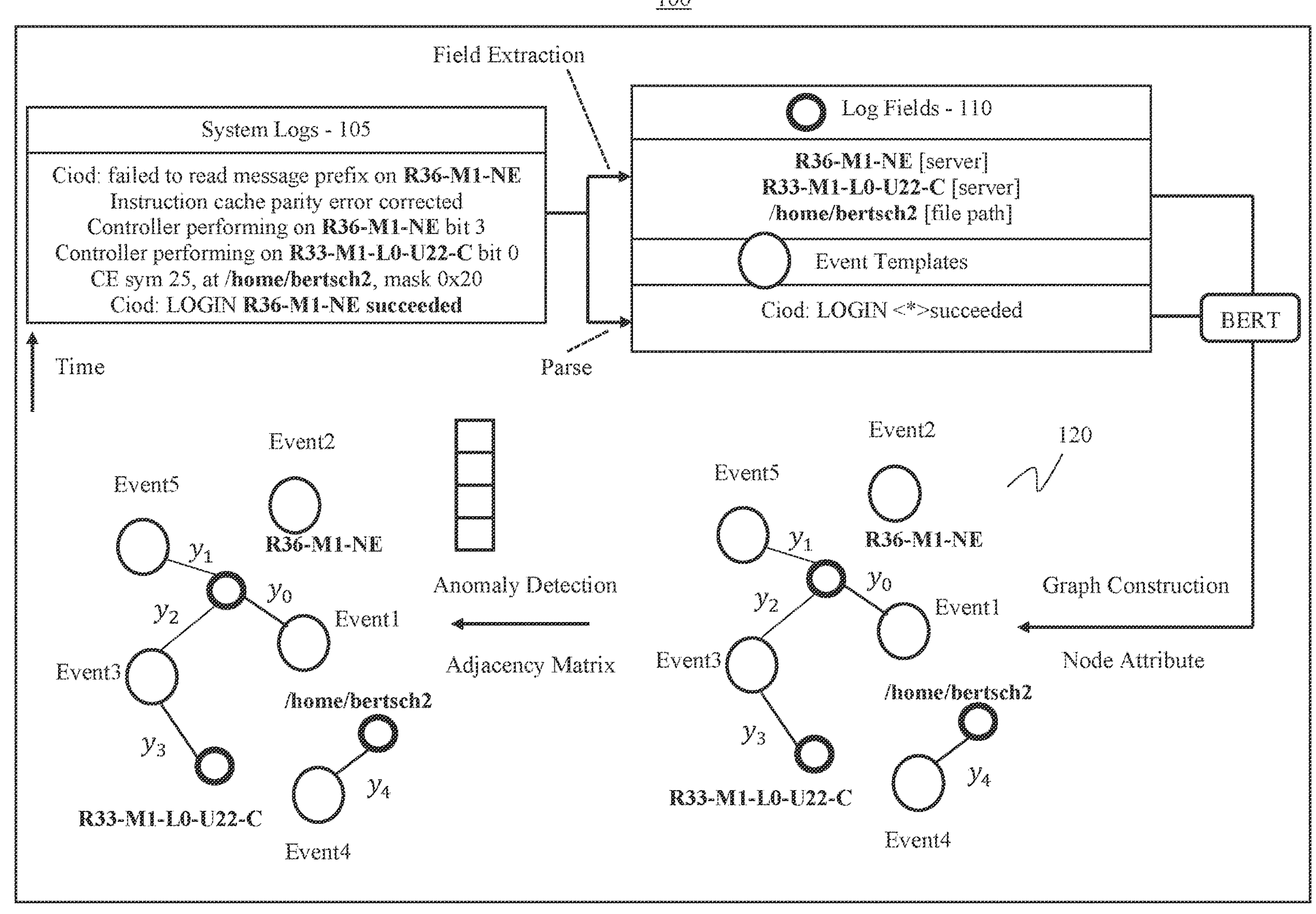
FIG. 1 is a block/flow diagram of an exemplary graph-based transformer framework, in accordance with embodiments of the present invention.

Anomaly detection is the task of identifying unusual or unexpected behaviors in a system or process. As computer systems become increasingly more sophisticated due to the expansion of new communication technologies and services, they are prone to various adversarial attacks and bugs. Moreover, such attacks have evolved and have become increasingly sophisticated. As a result, the difficulty of anomaly detection has increased, making many conventional detection approaches no longer effective, and it requires users to look deeper into the system, for example, the interaction among system components.

System logs capture system states and events across time to aid process monitoring and root cause analysis of running services. These log files are ubiquitous in almost all computer systems and include rich information, including control commands of machine systems, transactions of customer purchases, and logs of a computer program. As a result, they have proven a valuable resource for anomaly detection in both academic research and industry applications. Each log message usually has a predefined constant key template (known as a "event," e.g., a login activity) and a few variables (known as "entities" or "fields," e.g., services and users). When the events are arranged chronologically based on the recording time, they form a discrete log sequence. Various methods have been proposed to detect the anomalous sequential patterns in the sequence, such as, pattern recognition methods which consider event sequences with inconsistencies beyond a certain threshold to be anomalous. They treat an event alphabet sequence as an input in an independent dimension and ignore the sequential patterns between events. Other methods include sequential learning methods which analyze events sequentially with a defined sliding window in order to forecast the subsequent event based on the observation window.

However, the relationship between log events and fields, an essential indicator of system anomalies, has rarely been considered. This can lead to missed detection or false alarms, as anomalies may not be apparent from individual events or isolated patterns. Different from previous methods that only detect anomalous events in log sequences, the exemplary methods propose a new task that aims at detecting anomalous relation patterns between interconnected events and fields, where workers receive an unbalanced number of requests from a coordinator in a period of time, or a coordinator suddenly requests a connection to other workers. Without considering the relationships, these anomalies may not be able to be detected by conventional methods. In addition to detecting anomalous events, the anomalous relationships between events can help users understand the details and dynamics of the system, for example, what is the cause of the anomaly and how the anomaly propagates.

To achieve such goal, there are several challenges, that is, dynamic graphs need to be built to describe the relationships between log events and fields in different time windows. Thus, a reliable way to encode the dynamic graph considering entity semantics and relation patterns is needed. Connections need to be built between the incoming graph and previous graphs. The anomaly scores for each edge should be updated considering various scales of historical patterns. With the above challenges resolved, the exemplary methods can detect anomalous edges in the dynamic graph at any time.

The exemplary methods introduce GLAD, a Graph-based Log Anomaly Detection framework, to learn the relationship among log events and fields in addition to log semantics and sequential patterns for system relation anomaly detection. The exemplary approach introduces a method to construct dynamic graphs that describe the relationships among log events and fields over time and then leverages temporal-attentive transformers to capture the sequential patterns implicitly expressed in each time period. By considering both the relations between events and the temporal context, the exemplary approach can detect anomalies such as clients frequently requesting a server or clients suddenly requesting other servers. Specifically, a field extraction module utilizing prompt-based few-shot learning is first used to extract field information from log contents. Then, with the log events and fields extracted, dynamic graphs can be constructed for sliding windows with events and fields as nodes, and the relations between them as edges. At last, a temporal attentive graph edge anomaly detection method is proposed to detect anomalous relationship patterns from the evolving graphs, where a graph neural network (GNN)-based encoder facilitated with transformers is used to learn the structural, content, and sequential features.

To summarize, the exemplary methods detect system anomaly from a novel point of view, that is, the interaction and relationship between system components leveraging system logs. The main contribution is a framework for constructing dynamic graphs from logs and capturing relational anomalies using dynamic graphs and temporal-attentive transformers, which allows for more accurate and reliable log anomaly detection. It is believed the exemplary approach has the potential to significantly improve the effectiveness of log analysis in detecting more sophisticated anomalies in real applications.

As noted, the exemplary methods introduce a graph-based transformer framework, GLAD, for log anomaly detection. As shown in FIG. 1, GLAD 100 first extracts log fields 110 via a prompt-based seq2seq field extraction model, and then connects each field with the parsed event template in a pre-defined manner to yield dynamic log graphs 120. Finally, these dynamic log graphs 120 are encoded in a latent space using GNN encoders followed by a pre-trained transformer to distinguish between normal and anomalous edges with structural, semantic, and sequential information considered.

The mathematical notions are summarized in Table 1, reproduced below.

TABLE 1

| Symbol | Description |
|---|---|
| e | $e = \{x_1, \ldots, x_{\|e\|}\}$ log message is a sequence of tokens |
| S | $S = \{e_1, \ldots, e_{\|S\|}\}$ log sequence is a sequential series of logs |
| E | $E = \{ent_1, \ldots ent_{\|E\|}\}$ sequence of entities in a log message |
| Y | $Y = \{l_1, \ldots, l_{\|E\|}\}$ sequence of entity labels in a log message |
| S | $S = \{S_1, \ldots, S_{\|S\|}\}$ total sequences are a set of log sequences |
| $\mathcal{G}_t$ | the dynamic graph at time window t with $\mathcal{V}_t$ and $E_t$ |
| $\mathcal{V}_t$ | vertex set in graph $\mathcal{G}_t$ |
| $E_t$ | edge set in graph $\mathcal{G}_t$ |
| $X_t$ | attribute matrix in graph $\mathcal{G}_t$ |
| $A_t$ | adjacency matrix in graph $\mathcal{G}_t$ |
| $W^{(l)}$ | learnable weights in the l-th layer of a model, e.g., $W_g^{(l)}$ |
| I | identity matrix |
| $H_t$ | representation of graph $\mathcal{G}_t$ |
| N | total number of graphs in S |
| $H_S$ | representation sequence of graphs $\mathcal{G}_{t,} \ldots \mathcal{G}_N$ |
| Q, K, V | packed matrices of queries, keys and values for attention |
| $\sigma(\cdot)$ | activation function, e.g., ReLU(·). Sigmoid(·) |
| $\mathcal{L}$ | loss objective, including $\mathcal{L}_{ner}$, $\mathcal{L}^t$, $\mathcal{L}_{reg}$ |
| $P^+$ | positive prompt, e.g., "/home/cache is a path entity." |
| $P^-$ | negative prompt, e.g., "failed to is not a named entity." |
| h | representation of a log message |

A log is a sequence of tokens $e=\{x_1, \ldots, x_{|e|}\}$, where $x_i$ denotes the i-th token and $|e|$ is the log length. A log sequence is a series of logs ordered chronologically within an observed time window $S=\{e_1, \ldots, e_{|S|}\}$, where $e_i$ represents the i-th log and $|S|$ denotes the total number of logs in a time window. For a log sequence St in time window t, a temporal graph $\mathcal{G}_t=(\mathcal{V}_t, \varepsilon_t, X_t, A_t)$ is constructed, where $\mathcal{V}$, $\varepsilon_t$ denote the union of vertices and the union of edges, $X_t \in \mathbb{R}^{n \times d}$ and $A_t \in \mathbb{R}^{n \times n}$ are its attribute and adjacency matrices.

To build graph representations from log sequences, a prompt-based seq2seq model is introduced to extract fields 110 from given log messages 105. The extracted fields, together with log events 105 that are extracted using a log parser, are connected following pre-defined manners to construct the dynamic graphs 120. The exemplary methods then use a pre-trained BERT encoder to learn the semantics of each node string. The encoded hidden states for each node are regarded as its attribute, while the adjacency matrix represents the graph structure. The attributes and adjacency matrices are used together to detect anomalous edges.

Regarding prompt-based few-shot field extraction, real-world log datasets include a large quantity of log events and log fields with various syntactic formats, which makes the manual annotation nearly infeasible. Existing off-the-shelf tools either explore rule-based or search-based algorithms to extract event templates and fields from raw log messages, which only work for fields with fixed syntax patterns such as IP, email address, and URL, but fall short in recognizing entities such as users and services.

Log field extraction is considered a Named Entity Recognition (NER) task and a few-shot seq2seq learning procedure using BART is proposed to recognize log fields in this low resource scenario. Specifically, the exemplary methods define 15 common log field types which are useful for system monitoring by referring to the common log entity ontology, including IP, email, process ID (pid), user ID (uid), username, timestamp, service, server, file path, URL, port, session, duration, domain, and version. Note that the exemplary methods also apply rule-based methods utilizing regular expressions to extract IP, email, and URL.

For a log message $e=\{x_1, \ldots, x_{|e|}\}$ which includes a gold entity set $E=\{ent_1, \ldots, ent_{|E|}\}$ and label set $Y=\{l1, \ldots, l_{|E|}\}$, prompts $P_k^+$ are defined for each gold entity $ent_k$ (positive prompts) using pre-defined words (e.g., "$\langle ent_k \rangle$ is a/an $\langle l_k \rangle$ entity").

Non-entity prompts $P^-$ (negative prompts) are also defined for none of the named entity (e.g., "$\langle x_{i:j} \rangle$=none", where $x_{i:j}$ is a candidate text span). The exemplary methods consider two pairs of positive and negative prompts, $P_1$ and $P_2$, as shown in Table 2, reproduced below.

TABLE 2

| |
|---|
| Prompt $P_1$ |
| $P^+$ :⟨ candidate_span⟩ is a/an⟨ entity_type⟩ entity |
| $P^-$ :⟨ candidate_span⟩ is not a named entity |
| Prompt $P_2$ |
| $P^+$ :⟨ entity_type⟩ =⟨ candidate_span⟩ |
| $P^-$ :⟨ candidate_span⟩ = none |

Figure 2:
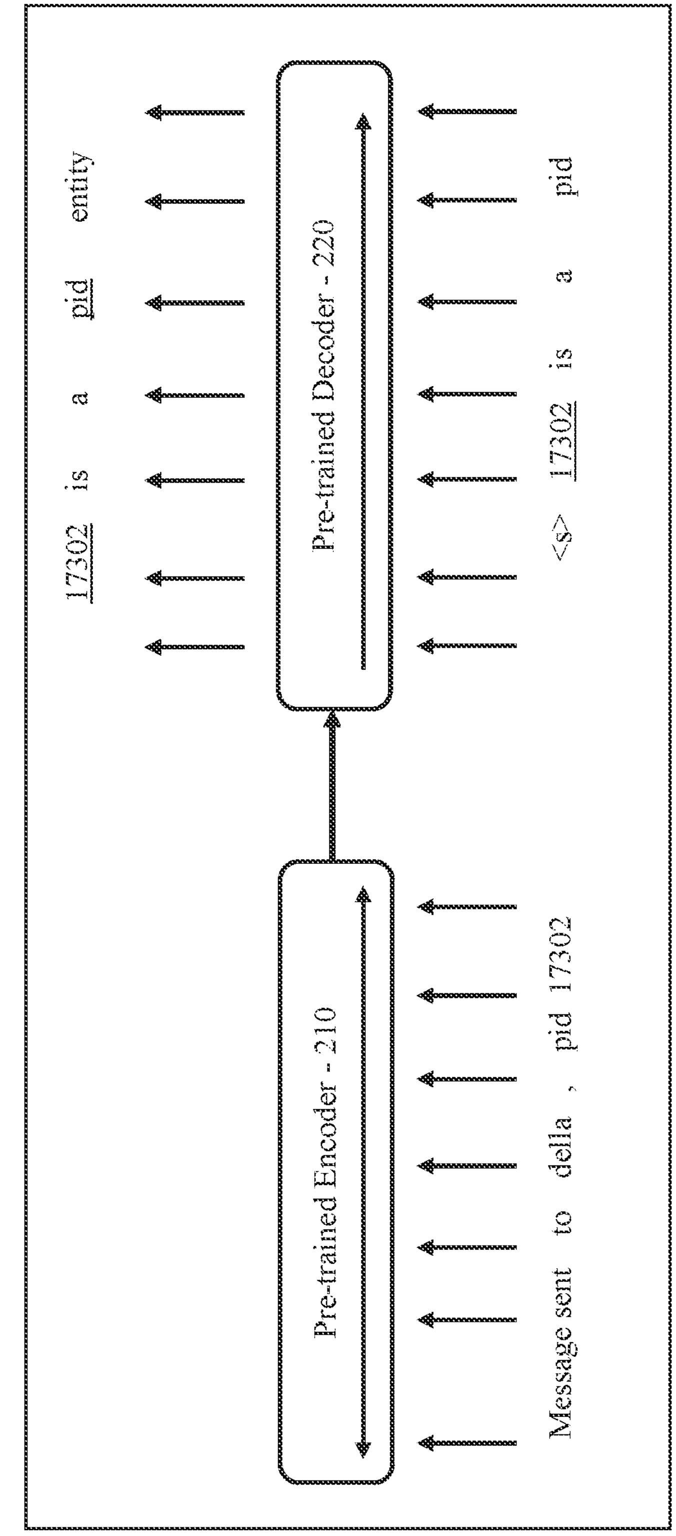
FIG. 2 is a block/flow diagram of training of a prompt-based method, in accordance with embodiments of the present invention.

Prompts are created using gold fields during training 200, as illustrated in FIG. 2, where a pre-trained encoder 210 and a pre-trained decoder 220 are employed. For each log message e, the exemplary methods use all its gold fields to construct (e, $P^+$) pairs and additionally create negative samples (e, $P^-$) by randomly sampling non-entity text spans. For efficiency, the number of n-grams for a span are restricted to 1~5, e.g., 5n negative prompts are created for each log message. After sampling, the number of negative pairs is three times that of positive pairs.

Given a sequence pair (e, P), the log messages e are fed to the encoder of BART and the hidden representations $h^{enc}$ are obtained:

$$h^{enc} = \text{Encoder}(x_{1:|e|}) \quad (1)$$

At the c-th decoding step, $h^{enc}$ and previous output tokens $t_{1:c-1}$ are used to yield a representation using attention:

$$h_c^{dec} = \text{Decoder}(h^{enc}, t_{1:c-1}) \quad (2)$$

The conditional probability of a word tc is defined as:

$$p(t_c | t_{1:c-1}, e) = \text{Softmax}(h_c^{dec} W_{ner} + b_{ner}) \quad (3)$$

where $W_{ner} \in \mathbb{R}^{dh \times |V|}$ and $b_{ner} \in \mathbb{R}^{|V|}$. $d_h$ is the hidden size of BART and |V| denotes the vocab size of its pretrained model.

The decoding objective is the cross-entropy loss for output with length m:

$$\mathcal{L}_{ner} = -\sum_{c=1}^{m} \log p(t_c \mid t_{1,c-1}, e) \quad (4)$$

During inference, all possible 1~5-grams text spans for a log message e are enumerated and scores for each prompt $P^{lk,xi:j}=\{t_1, \ldots, t_m\}$ are computed as follows:

$$f(P_{l_k,x_i,j}) = \sum_{c=1}^{m} \log p(t_c \mid t_{1:c-1}, e) \quad (5)$$

Figure 3:
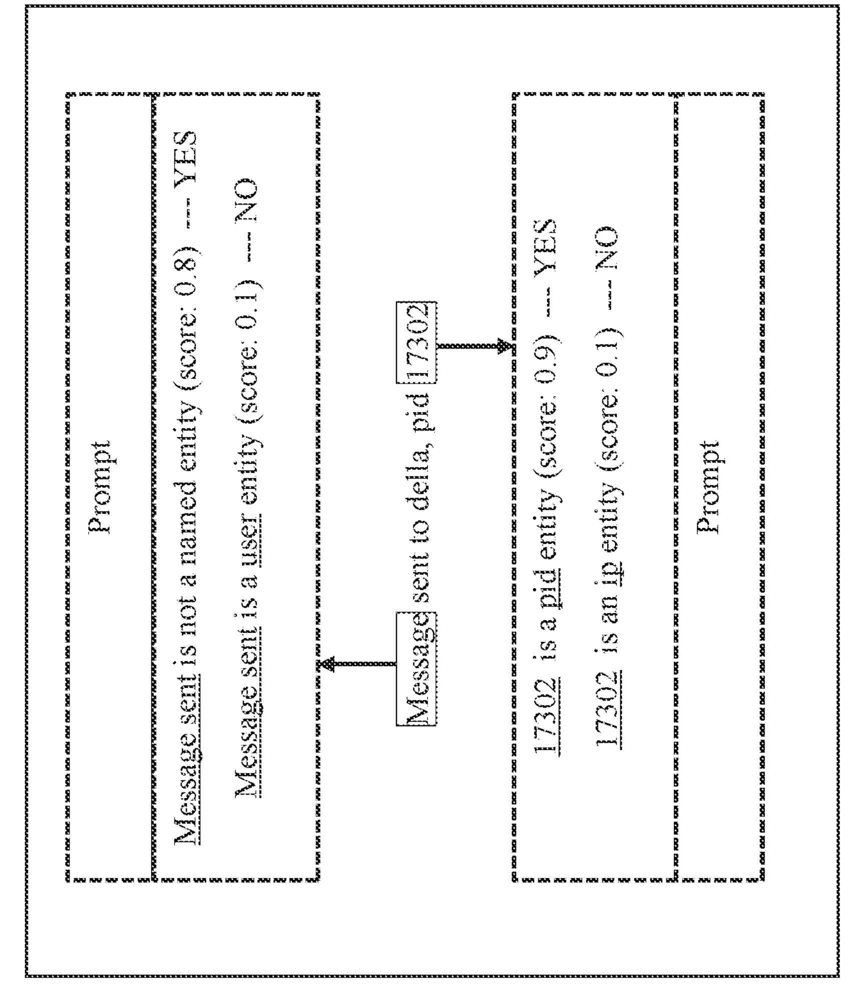
FIG. 3 is a block/flow diagram of an inference of a prompt-based method, in accordance with embodiments of the present invention.

The exemplary methods calculate score $f(P^+_{lk,xi:j})$ for each entity type and $f(P^-_{xi:j})$ for none entity types using BART. Then an entity type $l_k$ with the largest score is assigned to each text span $x_{i:j}$, as shown in FIG. 3 illustrating the prompt-based method 300.

Regarding the graph relation configuration, to better model the relation between entities and events across different log messages, a sliding window with a fixed time interval is used to snapshot a batch of log messages and construct the corresponding graph. After extracting fields from each log content, the exemplary methods formulate their relationships with event templates in a predefined manner. Specifically, each log instance includes an event template, e.g., "FAILED LOGIN for ⟨*⟩ to ⟨*⟩", and a list of extracted fields, e.g., ["della", "imap://localhost/" ], with corresponding entity types, e.g., ["user," "server" ]. The event template is connected to each recognized field to represent underlying behaviors in each log. In the yielded un-directed graph, if two log instances share any of the defined nodes, e.g., event and fields, they are indirectly connected to indicate implicit relationships.

Regarding the graph node attribute configuration, two types of nodes are defined based on the log data ontology, that is, events and fields with a corresponding type, e.g., ("imap://localhost/", "server"). Specifically, event templates are extracted using a log parser such as Drain, e.g., "FAILED LOGIN for ⟨*⟩ to ⟨*⟩". For each node, its input text format is defined and a BERT content-aware layer is employed to learn the sentence embedding h[CLS] as its attribute. Specifically, for log events, the exemplary methods directly use their template texts as the encoder inputs, while for log fields the exemplary methods use the aforementioned prompts as the input texts, e.g., "imap://localhost/ is a server entity." The output hidden states for the [CLS] token at the start of each input text capture the overall sentence semantics and are used as the node features for constructing attributed graphs.

Figure 4:
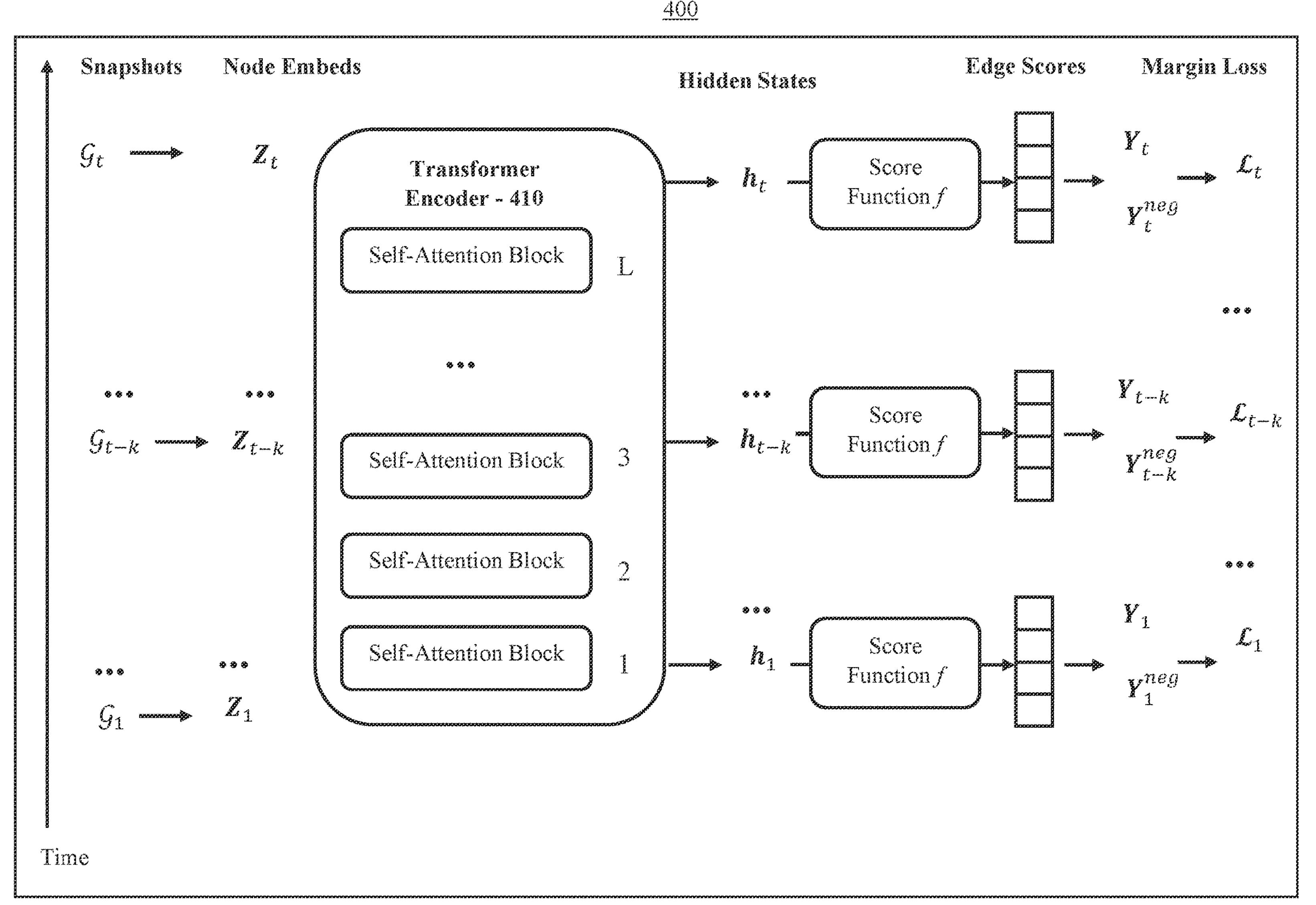
FIG. 4 is a block/flow diagram of an exemplary temporal-attentive graph edge anomaly detection framework, in accordance with embodiments of the present invention.

The overview of the temporal-attentive graph edge anomaly detection method 400 is illustrated in FIG. 4. A graph convolutional network (GCN) encoder is employed to encode the structural information for each graph snapshot, and a transformer encoder is employed to learn the temporal dependencies within the sequence of dynamic graphs. For each graph, certain negative edges are sampled and the edge score is calculated based on the learned hidden states. Finally, a pair-wise margin loss is utilized to minimize the positive edge scores and to maximize the negative edge scores, following the one-class training objective.

Regarding the graph convolutional network shared encoder, at time t, a graph snapshot $\mathcal{G}_t=(\mathcal{V}_t, \varepsilon_t, X_t, A_t)$ is received, where $X_t \in \mathbb{R}^{n\times d}$ and $A_t \in \mathbb{R}^{n\times n}$ are its attribute and adjacency matrices. The exemplary methods apply GCN to capture its attributed features as well as structural features. There are more advanced GNNs such as Graph Transformer (GT) network, yet it was found that GCN is more efficient while achieving competitive performance. Specifically, GCN considers the high-order node proximity when encoding the embedding representations, thus GCN alleviates the network sparsity issue beyond the observed links among nodes.

For an L-layered GCN, each layer can be expressed with the function:

$$H_t^{(l)} = f_\sigma\left(H_t^{(l-1)}, \hat{A}_t \middle| W_g^{(l)}\right) \tag{6}$$

$$f_\sigma\left(H_t^{(l)}, \hat{A}_t \middle| W_{g^{(l)}}\right) = \sigma\left(\hat{D}_t^{-\frac{1}{2}}\hat{A}_t\hat{D}_t^{-\frac{1}{2}}H_t^{(l)}W_g^{(l)}\right)$$

where $$W_g^{(l)}$$

is a learnable weight matrix for the l-th layer, $l\in[1, L]$. $\hat{A}_t=A_t+I$ denotes the adjacency matrix with inserted self-loops and $\hat{D}_{i,i}=\Sigma_{j=0}\hat{A}_{i,j}$ represents its diagonal degree matrix. $\sigma(\cdot)$ is a non-linear activation function where the ReLU is applied.

The exemplary methods take the attribute matrix $X_t$ as the initial hidden state $$H_t^{(0)}.$$

The output embedding matrix $$Zt = H_t^{(L)}$$

captures the nonlinearity of complex interactions between log entities and events within each graph. Nonetheless, it is still inadequate for detecting anomalies caused by malicious relations due to the lack of consideration for temporal features across graph snapshots.

Regarding the temporal-attentive transformers 410, given that system logs are generated chronologically and there are logically dependencies between previous log status and current log status, a transformer encoder is employed to incorporate the temporal features of the whole sequence into the latent space.

The exemplary methods receive a sequence of graph node embeddings $\{Z_1, \ldots, Z_N\}$ for all graphs. It is noted that the nodes in each graph are an un-ordered set $\mathcal{V}_t=\{v_1, \ldots, v_{|v_t|}\}$ rather than a sequence. A set transformer strategy is presented to remove order dependencies when encoding node embeddings. Specifically, the position embeddings are calculated according to the position of each graph in the sequence and all nodes belonging to each graph are assigned the same position embedding Ep. Then the embeddings for a graph at time t (with position p) is Et=Ep+Zt, and the representation sequence is given as $E_S=\{E_1, \ldots, E_N\}$.

The representation sequence is fed into the transformer blocks to compute long-term representations as follows:

$$H_S^{(l+1)} = FFN\left(\text{Attention}\left(H_S^{(l)}\right)\right) \tag{7}$$

where l is the layer number, and the initial hidden state $$H_s^{(0)} = E_s.$$

Subsequences are constructed with a sliding window of size w. Accordingly, each subsequence includes unique local information which acts as determining whether the whole sequence is abnormal or not. Specifically, given a subsequence of graph node embeddings $\{Z_{t-w-1}, \ldots, Z_t\}$ corresponding to the graphs $\{G_{t-w-1}, \ldots, G_t\}$, the subsequence representation can be expressed as $E_{S,w}=\{E_{t-w-1}, \ldots, E_t\}$. The same operations are executed to obtain the short-term representations $H_{S,w}$.

The exemplary methods concatenate the encoded long-term $H_S$ and short-term representations $H_{S,w}$ as the final node hidden states:

$$\mathcal{H} = [H_s \,||\, H_{S,w}]_{dim=1} \tag{8}$$

where [·||·]dim=1 is the concatenation operator of two matrices over the column-wise dimension. The final node representations $\mathcal{H}_t$ for graph $\mathcal{G}_t$ contains structural, content, and temporal features.

Regarding the edge-level training objective, until now, the exemplary methods get the hidden states of nodes $\mathcal{H}_t$ at timestamp t. For each edge $(i, j, w)\in\varepsilon_t$ with weight w, the embeddings for the i-th node are retrieved and the j-th node in $\mathcal{H}$ t, on which the exemplary methods can compute its anomalous score as follows:

$$f(i, j, w) = w\cdot\sigma(W_1 h_i + W_2 h_j - \mu) \tag{9}$$

where hi and hj are the hidden state of the i-th and j-th node respectively, and $\sigma(\cdot)$ is the sigmoid function. $W_1$ and $W_2$ are the weights in two fully-connected layers. $\mu$ is a hyperparameter in the score function. It is noted that this single layer network can be replaced by other complex networks.

To resolve the insufficiency of anomaly data during training 200, a model is built to optimize one-class (normal) data instead, meaning that it is assumed that all edges are normal in the training phase. The exemplary methods can apply a Bernoulli distribution with parameter $$\frac{d_i}{d_i + d_j}$$

for anomalous edge sampling according to the node degree d. Specifically, for each normal edge (i, j) in the graph, an anomalous edge is generated by replacing either node i by node i' with probability $$\frac{d_i}{d_i + d_j}$$

or node j by node j' with probability $$\frac{d_i}{d_i + d_j}.$$

Here di and dj are the degrees of the i-th node and the j-th node, respectively.

The exemplary methods apply a margin-based pairwise edge loss in training instead of using a strict objective function such as cross entropy to distinguish between existing edges and the generated edges as follows:

$$\mathcal{L}_e = \sum_{t=1,\dots,N} \min \sum_{(i,j,\omega)\in\varepsilon^t} \sum_{(i',j',\omega)\notin\varepsilon^t} \max\{0, \gamma + f(i,j,w) - f(i',j',w)\} \quad (10)$$

where $\gamma \in (0, 1)$ is the margin between the likelihood of normal edges and anomalous edges, and f(·, ·, ·) is the aforementioned anomalous edge score function. Minimizing the loss function $\mathcal{L}_e$ leads to a smaller f(i, j, w) and a larger f(i', j', w), fulfilling the one-class optimization goal.

To improve efficiency, the exemplary methods aim to select edges that are more significant for training. Specifically, for each pair of normal edge (i, j, w) and negative sampled edge (i', j', w), the exemplary methods discard it if f(i, j, w)>f(i', j', w) and otherwise reserve it for pairwise optimization. The intuition is that some edges in the snapshots may not be completely normal after training, and it is aspired to increase the reliability of the normal edges that are used to learn graph representations. Such selective negative sampling paradigm facilitates the stability of GLAD 100 in the whole training phase 200.

Regarding multi-granularity learning, besides the margin loss that differentiates normal and anomalous edges, the exemplary methods also introduce an ad-hoc heuristic to form a "soft-margin" decision boundary, e.g., selecting the graph representations whose distance to a center ranks at specific percentile as the decision boundary's radius. To this end, the graph representation for Gt is first formulated by maxpooling its node embeddings $\mathcal{H}_t$:

$$\mathcal{R}_t = \text{maxpooling}(\mathcal{H}_t) \quad (11)$$

From a graph-level, the anomalous graphs can be detected via one-class classification training, whose objective $\mathcal{L}_g$ is to learn a minimized hypersphere to enclose the graph representations as follows:

$$\min_{R,c,\varepsilon} R^2 + C\sum_{t=1}^{N}\varepsilon_t \quad (12)$$
$$\text{s.t. } \|\mathcal{R}_t - c\|^2 \le R^2 + \varepsilon_t,\ \varepsilon_t \ge 0,\ \forall\, t$$

where c is the center of the hypersphere, R is the radius of the hypersphere, $\|\mathcal{R}_t - c\|^2$ is the distance between the graph feature vector and the center, $\varepsilon_t$ is a slack variable for $\mathcal{R}_t$ that is introduced to tolerate the presence of outliers during training, and C is a hyper-parameter that trades off the errors $\varepsilon_t$ and the volume of the sphere. The objective defined in Equation (12) is to cluster all the training samples into a minimum hypersphere using Lagrange multipliers.

The exemplary methods propose a multi-granularity loss function that considers both edge-level and graph-level objectives:

$$\mathcal{L} = \mathcal{L}_e + \alpha\mathcal{L}_g + \frac{\lambda}{2}\sum\left(\|W_g\|_2^2 + \|W_a\|_2^2 + \|W_1\|_2^2 + \|W_2\|_2^2\right) \quad (13)$$

where $W_a$ denotes the weights of temporal-attentive transformers. Hyper-parameter $\alpha$ controls the trade-off between edge-level and graph-level violations, and $\lambda$ controls the weight decay L2 regularizer to avoid overfitting.

In conclusion, the exemplary methods introduce GLAD 100, a graph-based log anomaly detection framework designed to detect relational anomalies in system logs. GLAD 100 incorporates log semantics, relationship patterns, and sequential patterns into a unified framework for anomaly detection. Specifically, GLAD 100 first introduces a field extraction module that utilizes prompt-based few-shot learning to extract essential field information, such as services and users, from log contents. Then GLAD 100 constructs dynamic log graphs for sliding windows by leveraging the log events and extracted fields. These graphs represent events and fields as nodes and their relationships as edges. Subsequently, a temporal-attentive graph edge anomaly detection model 400 is presented for identifying anomalous relationships in the dynamic log graphs. This model employs a GNN-based encoder enhanced with transformers to capture structural, content, and temporal features.

Figure 5:
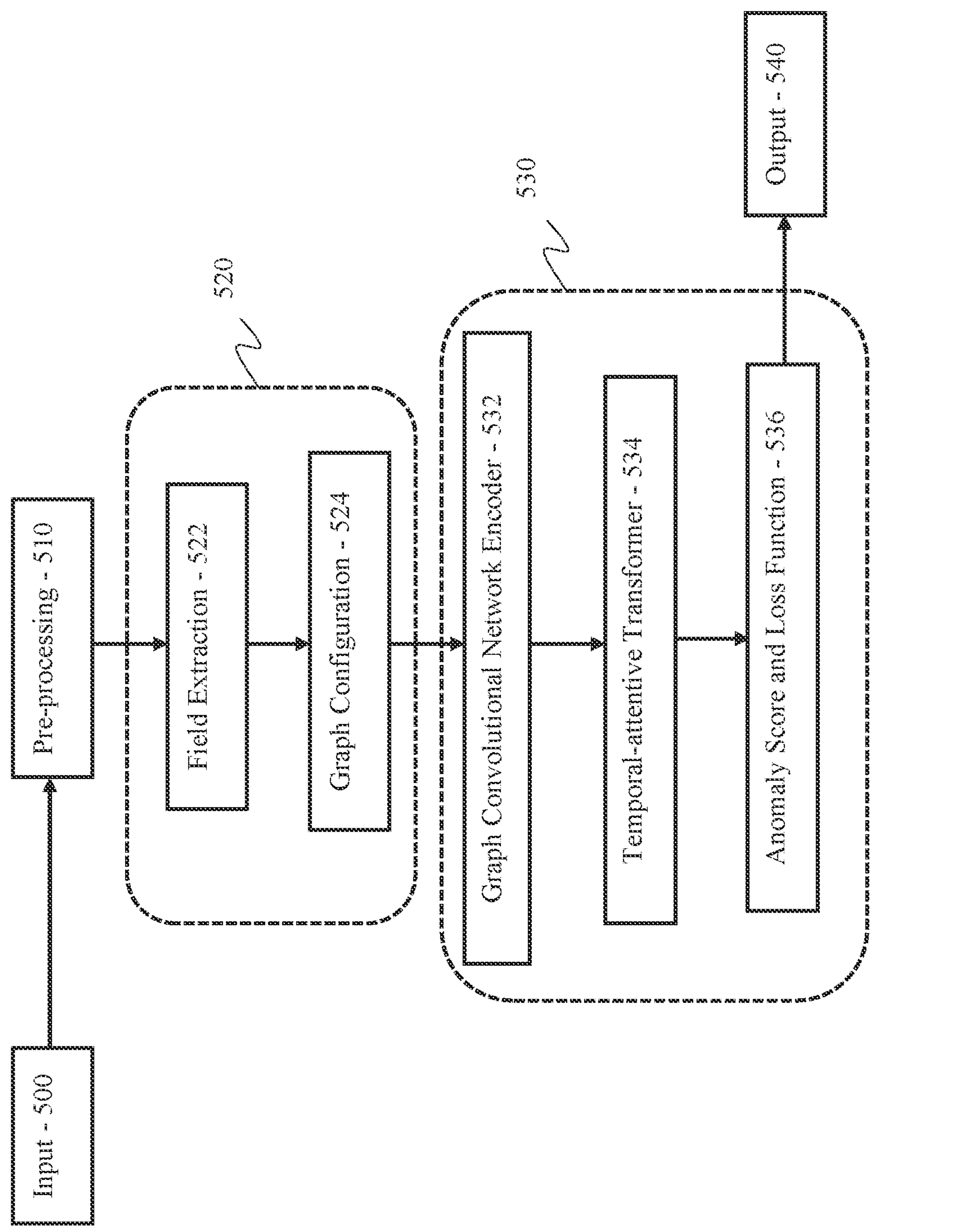
FIG. 5 is a block/flow diagram of an exemplary workflow of a temporal-attentive dynamic graph, in accordance with embodiments of the present invention.

FIG. 5 is a block/flow diagram of an exemplary workflow of a temporal-attentive dynamic graph, in accordance with embodiments of the present invention.

The goal of the pre-processing component 510 is to prepare the input 500 for the TDG module by parsing the logs into templates, and split log sequences with sliding-window.

The field extraction and graph configuration 520 includes a field extraction component 522 and a graph configuration component 524.

Regarding the field extraction component 522, log field extraction is considered a NER task and a few-shot seq2seq learning procedure using BART is presented to recognize log fields in this low-resource scenario. Specifically, the exemplary methods define 15 common log field types by referring to the common log entity ontology, including IP, email, process ID-(pid), user ID-(uid), username, timestamp, application, server, file path, url, port, session, duration, domain, and version.

For a log content X={$x_1$, . . . , $x_T$} containing the gold entity set E={$ent_1$, . . . , $ent_{|L|}$} and label set L={$1_1$, . . . , $1_{|L|}$}, words are used to define prompts $P^+_k$ for each true entity $ent_k$ (e.g., ⟨$ent_k$⟩ is a/an ⟨$1_k$⟩ entity). In addition, a non-entity template $P^-$ is defined for none of the named entity (e.g., ⟨candidate span⟩ is not a named entity). Prompts using gold fields are created or generated during training. For each log content X, the exemplary methods use all its gold fields to construct (X, $P^+$) pairs, and additionally create negative samples (X, $P^-$) by randomly sampling non-entity text spans. For efficiency, the number of n-grams for a span is restricted from one to five, so 5n negative prompts are created for each log content. After sampling, the number of negative pairs is three times that of positive pairs.

During inference, all possible 1~5-grams text spans are enumerated for a log content X. Then, the exemplary methods use the fine-tuned pre-trained BART generative model to assign a score for each prompt $P_{lk,xi:j}$={$t_1$, . . . , $t_m$}.

The exemplary methods calculate a score f($P^+$) for each entity type and f($P^-$) for the none entity type by applying BART to score prompts. Then, xi:j is assigned as the entity type with the largest score to the text span.

Regarding the graph configuration component 524, the exemplary methods define three types of nodes based on the log data ontology, component (e.g., "APP"), event template (e.g., "FAILED LOGIN for ⟨*⟩ to ⟨*⟩"), and fields (e.g., "imap://localhost/") with a corresponding entity type (e.g., "server"). For each node, its input text format is defined and a BERT content-aware layer is employed to learn the sentence embedding as its attribute.

Specifically, for event, the exemplary methods directly use the template text as the encoder input, while for component or field the exemplary methods use the aforementioned prompt as the input sentence (e.g., "imap://localhost/ is a server entity"). The output hidden states for the [CLS] token at the start of each input text capture the overall sentence semantics and are used as the node attribute.

The temporal-attentive graph edge anomaly detection architecture 530 includes a graph convolutional network encoder 532, a temporal-attentive transformer 534, and an anomaly score and loss function 536. The output of the temporal-attentive graph edge anomaly detection architecture 530 is designated as 540.

The exemplary methods thus first use a GCN encoder to encode the structural information for each graph snapshot, then use a transformer encoder to learn the temporal dependencies between the dynamic graphs. For each graph, the exemplary methods sample certain negative edges and calculate the edge score based on the learn hidden states. Then the exemplary methods employ a pair-wise margin loss to minimize the scores for positive edges and maximize the negative edge scores given the one-class training objective.

Therefore, in summary, the exemplary methods solve the log anomaly detection problem by utilizing a temporal-attentive dynamic graph anomaly detection model to capture both sequential patterns and relational patterns in log sequences. At least the following challenges are evident, that is, existing log anomaly detection models rarely utilize relation patterns in log data, how to extract the relation information is remain unknown, most existing log anomaly detection models cannot naturally capture the relation pattern in log sequences, which needs to be investigated, and the temporal pattern is still important in anomaly detection, and how to capture the temporal pattern and relation pattern together is an issue that needs to be resolved.

In accordance thereof, the exemplary methods introduce a two-step framework temporal-attentive dynamic graph (TDG) for anomaly detection in log sequences. In the first step, TDG first proposes a prompt-based sequence-to-sequence few-shot field extraction method to extract fields from log messages. Then the extracted fields together with log event templates and log components are connected as an attributed graph for each sliding time window. In the second step, a GCN encoder is used to encode the structural information for each graph snapshot, then a transformer encoder is employed to learn the temporal dependencies between the dynamic graphs. For each graph, the exemplary methods sample certain negative edges and calculate the edge score based on the learn hidden states. Then a pair-wise margin loss is presented to minimize the scores for positive edges and maximize the negative edge scores given the one-class training objective.

Moreover, the temporal-attentive dynamic graph anomaly detection framework enables anomaly detection in log sequences. TDG first builds dynamic graphs from logs using a prompt-based few-shot field extraction method. Then it uses a GCN-transformer architecture to detect the anomalies. A prompt-based few-shot field extraction method to extract fields from log messages is then employed, generating dynamic graphs of log fields to capture the relations between log fields. A GCN encoder is used to encode the structural information for each graph snapshot. A temporal-attentive transformer encoder is then employed to learn the temporal dependencies between the graph snapshots and a pair-wise margin loss is designed for anomaly detection to address label efficiency.

Figure 6:
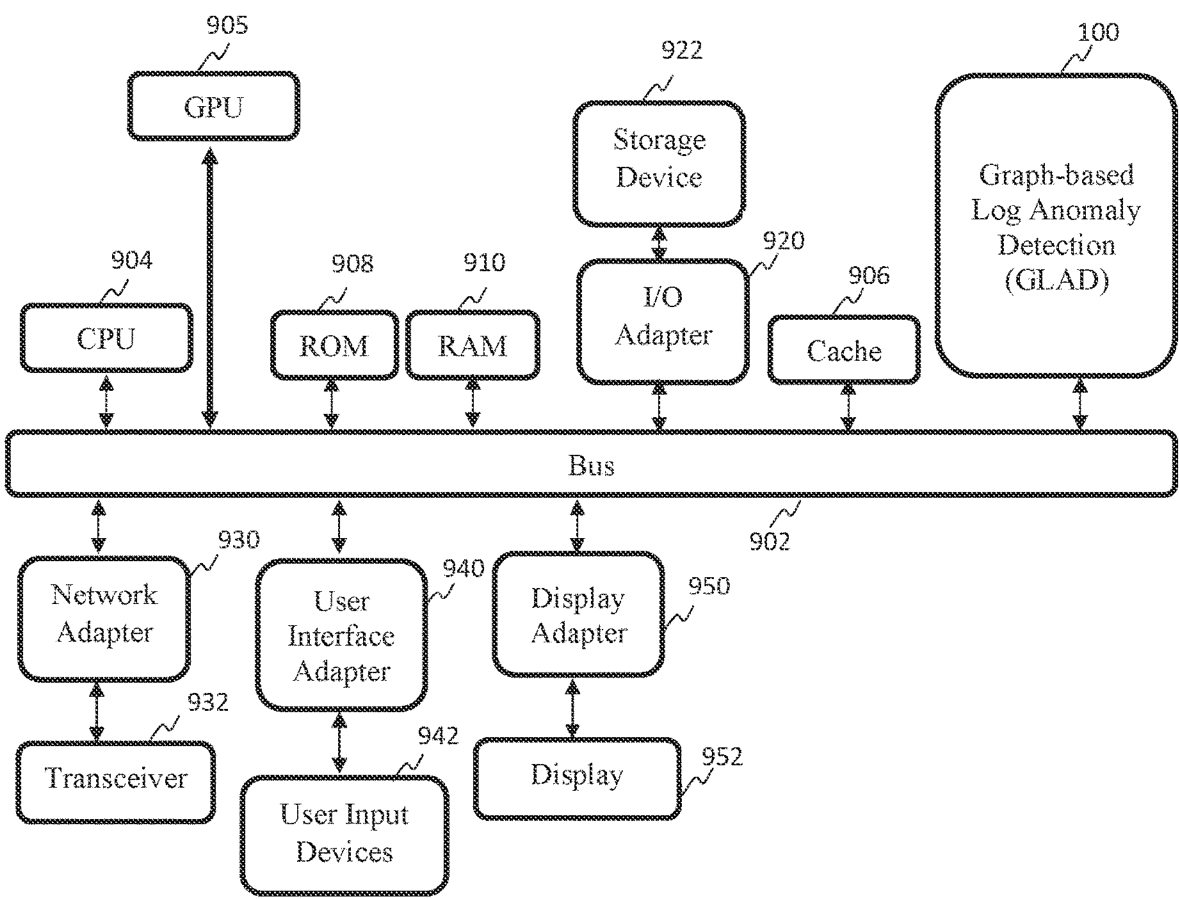
FIG. 6 is a block/flow diagram of an exemplary processing system for employing a graph-based log anomaly detection framework to detect relational anomalies in system logs, in accordance with embodiments of the present invention.

FIG. 6 is an exemplary processing system for employing a graph-based log anomaly detection framework to detect relational anomalies in system logs, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, GLAD 100 is presented.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
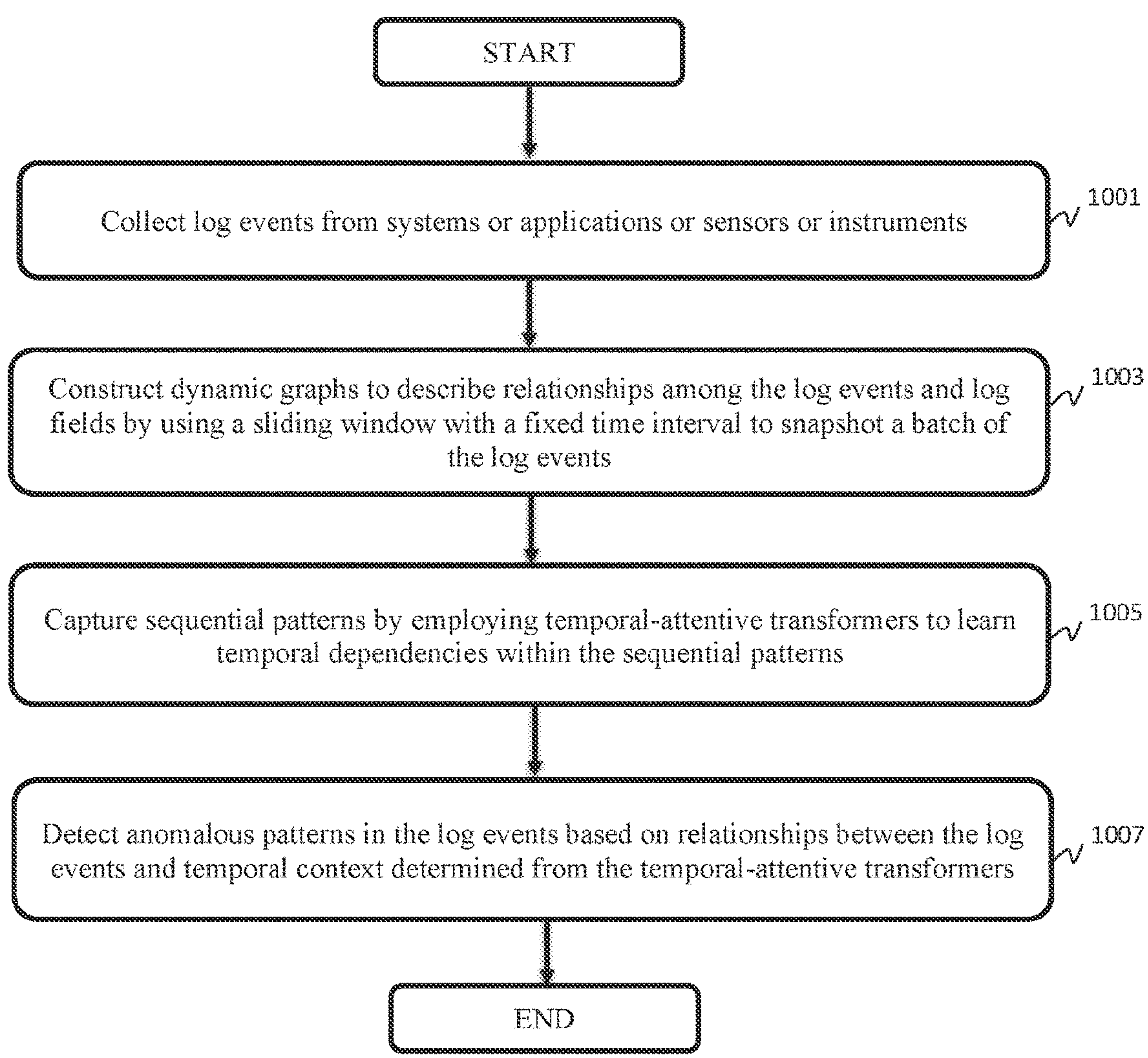
FIG. 7 is a block/flow diagram of an exemplary method for employing a graph-based log anomaly detection framework to detect relational anomalies in system logs, in accordance with embodiments of the present invention.

FIG. 7 is a block/flow diagram of an exemplary method for employing a graph-based log anomaly detection framework to detect relational anomalies in system logs, in accordance with embodiments of the present invention.

At block 1001, collect log events from systems or applications or sensors or instruments.

At block 1003, construct dynamic graphs to describe relationships among the log events and log fields by using a sliding window with a fixed time interval to snapshot a batch of the log events.

At block 1005, capture sequential patterns by employing temporal-attentive transformers to learn temporal dependencies within the sequential patterns.

At block 1007, detect anomalous patterns in the log events based on relationships between the log events and temporal context determined from the temporal-attentive transformers.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for employing a graph-based log anomaly detection framework to detect relational anomalies in system logs, the method comprising:

collecting log events from systems or applications or sensors or instruments;

constructing dynamic graphs to describe relationships among the log events and log fields by using a sliding window with a fixed time interval to snapshot a batch of the log events, wherein a log anomaly detection framework detects relational anomalies in system logs and incorporates log semantics, relationship patterns, and sequential patterns into a unified framework for anomaly detection;

capturing sequential patterns by employing temporal-attentive transformers to learn temporal dependencies within the sequential patterns, wherein each subsequence includes unique local information for determining whether a whole sequence is abnormal or not; and detecting anomalous patterns in the log events based on relationships between the log events and temporal context determined from the temporal-attentive transformers and representations in the dynamic graphs whose distance to a center ranks at a specific percentile beyond a decision boundary radius including a soft-margin decision boundary determined by an ad-hoc heuristic.

2. The computer-implemented method of claim 1, wherein a field extractor employs prompt-based few-shot learning to extract the log fields.

3. The computer-implemented method of claim 1, wherein the dynamic graphs are encoded in a latent space by using graph convolutional network (GCN) encoders followed by a pre-trained transformer.

4. The computer-implemented method of claim 3, wherein the GCN encoders distinguish between normal and anomalous edges with structural, semantic, and sequential information.

5. The computer-implemented method of claim 3, wherein encoded hidden states for each of the log events and log fields is regarded as an attribute and an adjacency matrix represents a structure of the dynamic graphs.

6. The computer-implemented method of claim 1, wherein, for each dynamic graph, negative edges are sampled and edge scores are calculated based on learned hidden states.

7. The computer-implemented method of claim 6, wherein a pair-wise margin loss is utilized to minimize positive edge scores and to maximize negative edge scores following a one-class training objective.

8. A computer program product for employing a graph-based log anomaly detection framework to detect relational anomalies in system logs, the computer program product comprising a non-transitory computer readable storage medium having program instructions embodied therewith, the program instructions executable by a computer to cause the computer to perform a method comprising:

collecting log events from systems or applications or sensors or instruments;

constructing dynamic graphs to describe relationships among the log events and log fields by using a sliding window with a fixed time interval to snapshot a batch of the log events, wherein a log anomaly detection framework detects relational anomalies in system logs and incorporates log semantics, relationship patterns, and sequential patterns into a unified framework for anomaly detection;

capturing sequential patterns by employing temporal-attentive transformers to learn temporal dependencies within the sequential patterns, wherein each subsequence includes unique local information for determining whether a whole sequence is abnormal or not; and detecting anomalous patterns in the log events based on relationships between the log events and temporal context determined from the temporal-attentive transformers and representations in the dynamic graphs whose distance to a center ranks at a specific percentile beyond a decision boundary radius including a soft-margin decision boundary determined by an ad-hoc heuristic.

9. The computer program product of claim 8, wherein a field extractor employs prompt-based few-shot learning to extract the log fields.

10. The computer program product of claim 8, wherein the dynamic graphs are encoded in a latent space by using graph convolutional network (GCN) encoders followed by a pre-trained transformer.

11. The computer program product of claim 10, wherein the GCN encoders distinguish between normal and anomalous edges with structural, semantic, and sequential information.

12. The computer program product of claim 10, wherein encoded hidden states for each of the log events and log fields is regarded as an attribute and an adjacency matrix represents a structure of the dynamic graphs.

13. The computer program product of claim 8, wherein, for each dynamic graph, negative edges are sampled and edge scores are calculated based on learned hidden states.

14. The computer program product of claim 13, wherein a pair-wise margin loss is utilized to minimize positive edge scores and to maximize negative edge scores following a one-class training objective.

15. A computer processing system for employing a graph-based log anomaly detection framework to detect relational anomalies in system logs, comprising:

a memory device for storing program code; and a processor device, operatively coupled to the memory device, for running the program code to:

collect log events from systems or applications or sensors or instruments;

construct dynamic graphs to describe relationships among the log events and log fields by using a sliding window with a fixed time interval to snapshot a batch of the log events, wherein a log anomaly detection framework detects relational anomalies in system logs and incorporates log semantics, relationship patterns, and sequential patterns into a unified framework for anomaly detection;

capture sequential patterns by employing temporal-attentive transformers to learn temporal dependencies within the sequential patterns, wherein each subsequence includes unique local information for determining whether a whole sequence is abnormal or not; and detect anomalous patterns in the log events based on relationships between the log events and temporal context determined from the temporal-attentive transformers and representations in the dynamic graphs whose distance to a center ranks at a specific percentile beyond a decision boundary radius including a soft-margin decision boundary determined by an ad-hoc heuristic.

16. The computer processing system of claim 15, wherein a field extractor employs prompt-based few-shot learning to extract the log fields.

17. The computer processing system of claim 15, wherein the dynamic graphs are encoded in a latent space by using graph convolutional network (GCN) encoders followed by a pre-trained transformer.

18. The computer processing system of claim 17, wherein the GCN encoders distinguish between normal and anomalous edges with structural, semantic, and sequential information.

19. The computer processing system of claim 17, wherein encoded hidden states for each of the log events and log fields is regarded as an attribute and an adjacency matrix represents a structure of the dynamic graphs.

20. The computer processing system of claim 15, wherein, for each dynamic graph, negative edges are sampled and edge scores are calculated based on learned hidden states.

* * * * *